US012765703B2

(12) United States Patent
Carlson

(10) Patent No.: US 12,765,703 B2
(45) Date of Patent: Oct. 20, 2026

(54) HANGING SCROLL CHRISTMAS TREE WITH KIT FOR ORNAMENTATION AND LIGHTING

(71) Applicant: PLAYING WITH AWARENESS LLC, Los Angeles, CA (US)

(72) Inventor: Christine Doley Carlson, Los Angeles, CA (US)

(73) Assignee: PLAYING WITH AWARENESS LLC, Los Angeles, CA (US)

(*) Notice: Subject to any disclaimer, the term of this patent is extended or adjusted under 35 U.S.C. 154(b) by 0 days.

(21) Appl. No.: 19/394,420

(22) Filed: Nov. 19, 2025

(65) Prior Publication Data

US 2026/0174263 A1 Jun. 25, 2026

Related U.S. Application Data

(60) Provisional application No. 63/725,408, filed on Nov. 26, 2024.

(51) Int. Cl.

| | |
|---|---|
| ***A47G 33/06*** | (2006.01) |
| ***A47G 33/08*** | (2006.01) |
| ***F21S 4/20*** | (2016.01) |
| ***F21S 9/02*** | (2006.01) |
| ***F21V 17/00*** | (2006.01) |
| *F21W 121/04* | (2006.01) |

(Continued)

(52) U.S. Cl.
CPC ............. *A47G 33/06* (2013.01); *A47G 33/08* (2013.01); *F21S 4/20* (2016.01); *F21S 9/02* (2013.01); *F21V 17/007* (2013.01); *F21W 2121/04* (2013.01); *F21W 2131/304* (2013.01); *F21Y 2105/12* (2016.08)

(58) Field of Classification Search
CPC . A47G 33/06; A47G 33/08; F21S 4/10; F21S 4/20; F21S 9/02; F21V 17/007
USPC .... 362/123, 249.06, 249.14, 249.16, 249.18, 362/249.19
See application file for complete search history.

(56) References Cited

U.S. PATENT DOCUMENTS

| | | | |
|---|---|---|---|
| 4,652,239 A | 3/1987 | Brimberg | |
| 4,657,800 A * | 4/1987 | Long ...................... | A47G 33/06 428/102 |

(Continued)

FOREIGN PATENT DOCUMENTS

| | | |
|---|---|---|
| CN | 208144880 U | 11/2018 |

OTHER PUBLICATIONS

Zhang Furong, CN208144880 U (Nov. 27, 2018) Hanging Christimas Tree, —Espacenet—English Machine Translation—Bib Data / Description/claims.

*Primary Examiner* — Thomas M Sember

(57) ABSTRACT

A hanging scroll textile with mount that provides a graphical representation of a Christmas tree is provided in kit form. The kit includes a packing tube for shipment and storage, a thin elongated string of lights, a battery pack to power the lights, and a plurality of pin ornaments and a plurality of hanging ornaments. The kit provides instructions for assembly by a user. The hanging scroll design provides a finished Christmas tree graphical display on the obverse side of the scroll mount, eliminating the necessity to use drawing implements to finish a crude outline or blank design for a tree. The hanging scroll design is environmentally friendly, as it eliminates the necessity for harvest, transport, and disposal of live trees.

27 Claims, 12 Drawing Sheets

(51) Int. Cl.

| | |
|---|---|
| *F21W 131/304* | (2006.01) |
| *F21Y 105/12* | (2016.01) |

(56) References Cited

U.S. PATENT DOCUMENTS

| | | | | | |
|---|---|---|---|---|---|
| 4,966,793 | A | * | 10/1990 | Covell ...................... | B44C 5/00<br>428/7 |
| 5,477,437 | A | * | 12/1995 | Lach ...................... | G09F 17/00<br>362/249.19 |
| 6,116,752 | A | * | 9/2000 | Mayfield ................. | F21V 21/08<br>362/147 |
| 6,258,428 | B1 | | 7/2001 | Phillips et al. | |
| 7,198,383 | B2 | * | 4/2007 | Martino .................. | G09F 13/22<br>362/249.06 |
| 2006/0213101 | A1 | | 9/2006 | Sobonya et al. | |
| 2016/0367058 | A1 | | 12/2016 | Ward | |

* cited by examiner

HANGING SCROLL CHRISTMAS TREE WITH KIT FOR ORNAMENTATION AND LIGHTING

STATEMENT OF GOVERNMENT INTEREST

Not Applicable.

COPYRIGHT RIGHTS IN THE DRAWING

A portion of the disclosure of this patent document contains material that is subject to copyright protection. The patent owner has no objection to the facsimile reproduction by anyone of the patent document or the patent disclosure, as it appears in the Patent and Trademark Office patent file or records, but otherwise reserves all copyright rights whatsoever.

RELATED PATENT APPLICATIONS

This application claims priority from prior U.S. Provisional Patent Application Ser. No. 63/725,408, filed on Nov. 26, 2024, entitled HANGING SCROLL CHRISTMAS TREE WITH KIT FOR ORNAMENTATION AND LIGHTING, the disclosure of which is incorporated herein in its entirety, including the specification, drawing, and claims, by this reference.

TECHNICAL FIELD

This disclosure relates to wall hangings, and more particularly, decorative wall hangings used as substitutes for live Christmas trees.

BACKGROUND

Traditional Christmas celebrations often involve obtaining, decorating, and lighting a tree, and then removing decorations and disposing of the tree after the holiday is over. Live tree use involves cutting a tree, or purchasing a tree cut by others, and then transporting the tree home for use. Use of natural trees involves at least some increased risk of fire associated with lighting such a tree, even when properly watered to minimize loss of needles. In any event, drying trees tend to increase such fire risk over time, as well as dropping needles below the tree. Consequently, in some locales, use of artificial trees has increased. In general, artificial trees are relatively expensive, and even when broken down after the holiday, still require substantial storage space in increasingly small living quarters.

One currently available alternative to use of natural or artificial Christmas trees is set out in US Pat. App Pub. No. 2016/0367058 A1, published Dec. 22, 2016, by Zachary WARD. While that application provides a wall hanging which may be developed by a user into a celebratory Christmas tree rendering using drawing utensils provided, such as markers, crayons, etc., it is essentially a "paint by numbers" project provided for development on a long sheet of paper that can be rolled up and stored when the art project has been completed and the holiday season is over. Unfortunately, such a product leaves the work of creation of a decorative tree in the hands of a purchaser, and does not provide for a lighted tree configuration.

Technical Problem to be Solved

There is a substantial need in the art for a low cost, customizable yet fully developed storable Christmas tree design, which can be customized using provided ornamental components and lighting, yet adapted by each user to their unique expression for a celebratory Christmas tree. Moreover, there is a need for an easy to assemble, use, and store Christmas tree device which is environmentally friendly—i.e. eliminates tree cutting- and thus reduces the environmental effects of harvesting, transport, and disposal which are incurred by use of traditional natural trees for Christmas celebrations. Further, the device described herein eliminates fire hazards associated with use of natural trees. The invention(s) disclosed herein are provided to solve these existing problems.

Some Objects, Advantages, and Novel Features

Accordingly, one objective of the invention(s) disclosed herein is to provide an easily fabricated Christmas tree wall hanging which is simple, straightforward, and eliminates the necessity of drawing or artwork on the part of the user is eliminated.

Another objective of the invention(s) disclosed herein is to provide a hanging scroll type wall hanging for use as a Christmas tree, and which eliminates, or substantially minimizes, the adverse environmental effects incurred by harvest, transport, use, and disposal of natural trees for a holiday celebration.

It is an advantage of the invention(s) disclosed herein that a fully finished artistic rendering of a coniferous tree is provided on a textile sheet, using non-toxic inks printed using technology that minimizes carbon footprint involved. Consequently, the product described herein eliminates the need to provide drawing implements to users, and eliminates the need for users to spend time creating a rendering of a tree to their liking. The provision of such a fully rendered printing, for example on canvas, is especially advantageous for use by those with physical disabilities or that may be relatively immobile or seriously ill, such as hospital patients. And, the compact size is quite useful for display in small apartments, dorm rooms, or other spaces without adequate area to allow erection and display of a natural tree for Christmas decorations.

In short, a key advantage of the invention(s) disclosed herein is the provision of a wall handing with a preprinted fully finished Christmas tree provided thereon. Further, such a fully finished individualized custom tree may be easily decorated and further developed using the combination of a battery powered elongated string of multiple lights, pin ornaments affixable to the textile base, and hanging ornaments which may be hooked to the elongated thin string of multiple lights.

SUMMARY

In an embodiment, a kit may be provided for a graphic Christmas tree assembly system. The kit may include a hanging scroll, where the hanging scroll includes a textile sheet having an upper edge and a lower edge, and an obverse side and a reverse side. The obverse side is a mount which has printed thereon a fully developed graphic artistic rendering of a coniferous tree, such as a pine, spruce, or fir tree. In an embodiment, the mount may be a single color mount. In an embodiment, the textile sheet may be a canvas sheet. A top bar is provided and is affixed to the upper edge of the textile sheet. A hanger is provided, and configured for attachment to, or may be provided attached to, the top bar. The hanger is provided to facilitate suspension of the textile sheet from the top bar, so that the textile sheet may be unrolled and displayed in a vertical format in substantially planar form. A bottom bar is provided. The bottom bar is affixed to the lower edge of the textile sheet. In an embodiment, the bottom bar may be provided as an elongated two piece bar, where the elongated two piece bar has a front piece and a rear piece. In such an embodiment, at least a portion of the lower edge of the textile sheet may be secured between the front piece and the rear piece. For storage and shipment, the textile sheet is provided in a rolled-up configuration, with the top bar and the bottom bar attached thereto. In an embodiment, the bottom bar may be weighted to provide downforce as necessary to straighten the textile sheet into a substantially planar configuration when the textile sheet is unrolled and hung as a hanging scroll.

In an embodiment, a plurality of pin ornaments may be provided. In an embodiment, one or more of the plurality of pin ornaments may include an ornamental face, a pin for secure attachment to the obverse side of the textile sheet, and a locking pin back, wherein the pin extends through the textile sheet and the locking pin back is configured for use on the reverse side of the textile sheet, and for snug fitting engagement with the reverse side of the textile sheet. In this manner, the locking pin back is securely attached to the pin, so as to secure each of the one or more of the plurality of pin ornaments snugly against the textile sheet.

In an embodiment, an elongated thin string of lights is provided. In an embodiment, the elongated thin string of lights may be battery powered. In an embodiment, the elongated thin string of lights may include between about twenty (20) and about fifty (50) sixty (60) individual lights. In an embodiment, the coniferous tree in the graphic rendering has a treetop point, and the textile sheet may include a first aperture therethrough defined by first aperture sidewalls. When the first aperture is located at or adjacent the treetop point, it may be sized and shaped so as to allow passage therethrough of the elongated thin string of lights. In an embodiment, when deployed, the elongated thin string of lights may be strung between pin ornaments. In an embodiment, pin ornaments may be located by a user at locations defined by cones located at or adjacent bough distal ends on the graphic rendering of a coniferous tree. In an embodiment, the battery pack may be provided for powering the elongated thin string of lights, and a battery pack holder may be provided on the reverse side of the textile sheet adjacent the top bar.

In an embodiment, a plurality of hanging ornaments may be provided. At least some of the hanging ornaments may be provided with a string loop, and such ornaments may be hung from the elongated thin string of lights. At least some of the hanging ornaments may be provided with attachment hooks, and such ornaments may be hung from the elongated thin string of lights when the hanging scroll is unrolled and hung, and when the pin ornaments and the elongated thin string of lights are affixed to the hanging scroll.

BRIEF DESCRIPTION OF THE DRAWING

The present invention(s) will be described by way of exemplary embodiments, using for illustration the accompanying drawing in which like reference numerals denote like elements, and in which.

Figure 1:
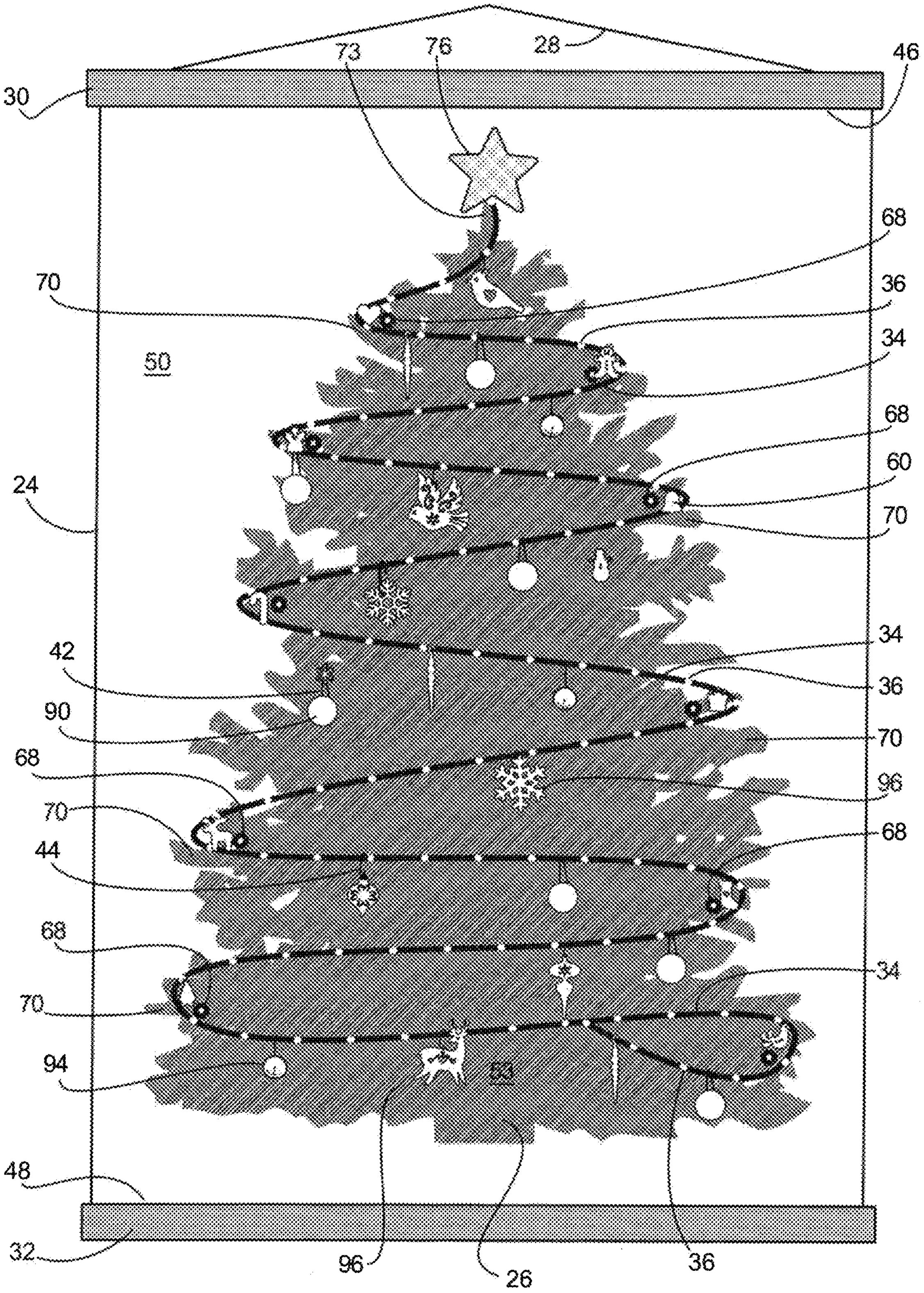
FIG. 1 is front elevation view, looking at a hanging scroll with graphical rendering of a coniferous Christmas tree thereon, with hanger supporting the hanging scroll from the top bar, with the textile sheet extending downward to a bottom bar, and showing use of an elongated thin string of lights which is supported by various pin ornaments, and various hanging ornaments suspended from the elongated thin string of lights.

The foregoing figures, being merely exemplary, contain various elements that may be present or omitted from a final configuration for an exemplary kit for a hanging scroll with graphic representation of a coniferous Christmas tree with ornamentation and lighting. Other variations in components for provision of a kit, or methods for assembling the same, or final configurations of the various components, may be provided. And somewhat different materials of construction, structural components such as the mount for the hanging scroll, or top and bottom bars used for display of the mount and graphics on the obverse side thereof, or ornament attachment configurations, or hanger configurations, and yet employ the basic design principles described and claimed herein, and as generally depicted in the drawing figures provided. An attempt has been made to draw the figures in a way that illustrates at least those elements that are significant for an understanding of exemplary kit design for creation of a personalized hanging scroll Christmas tree display. Such details may be quite useful for providing various types of kits for the assembly of a personalized Christmas tree display. Thus, it should be understood that various features may be utilized in accord with the teachings hereof, as may be useful in different embodiments for making and providing kit designs for hanging scroll type Christmas tree displays, within the scope and coverage of the teachings herein as defined by the claims.

DETAILED DESCRIPTION

Figure 12:
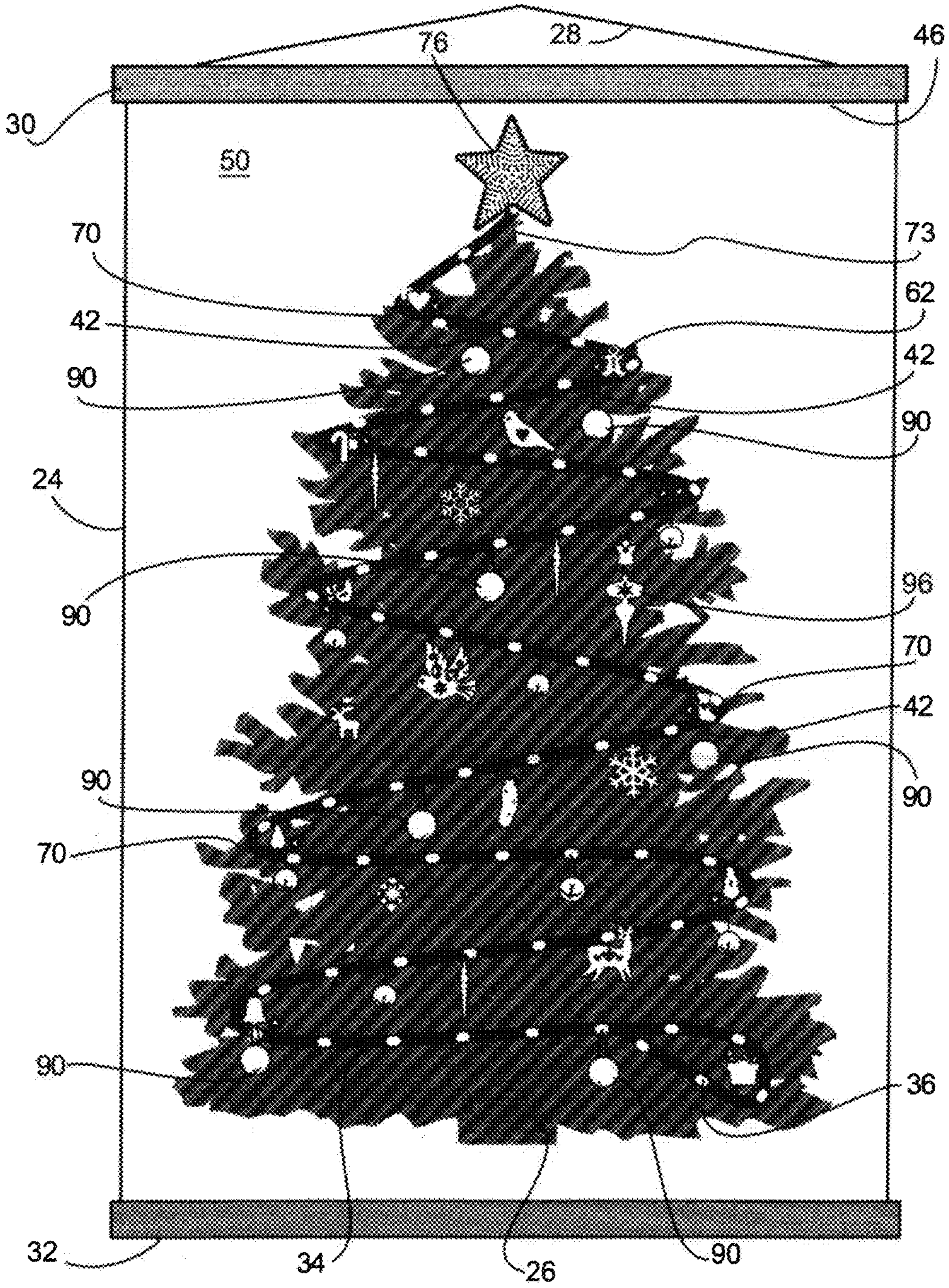
FIG. 12 provides a front elevation view of a hanging scroll Christmas tree, when hung for display, and shows components from the kit, including pin ornaments, hanging ornaments, and the elongated thin string of lights as may be installed.

Attention is directed to FIGS. 1 and 12, which provide a front elevation view of a fully assembled kit 18 (see FIG. 2, for a components of a packaged kit 18, including instruction sheet 21 for use in assembling kit 18 components) for a hanging scroll 20 Christmas tree display. Hanging scroll 20 includes a textile sheet 24 which provides a mount for a graphical rendering 26 of a Christmas tree thereon. In an embodiment, the mount provided by textile sheet 24 may be a single color mount. In an embodiment, the textile sheet 24 may be provided in the form of a canvas sheet. A hanger 28 may be used to support the hanging scroll 20 from the top bar 30. The textile sheet 24 extends downward to a bottom bar 32. This FIG. 1 shows the use of an elongated thin string 34 of lights 36 which is supported by various pin ornaments 60. Further, various hanging ornaments are suspended from the elongated thin string 34 of lights 36, including first hanging ornaments 40 suspended by string loops 42, and second hanging ornaments 43 suspended by hooks 44 or string loops 42.

Figure 6:
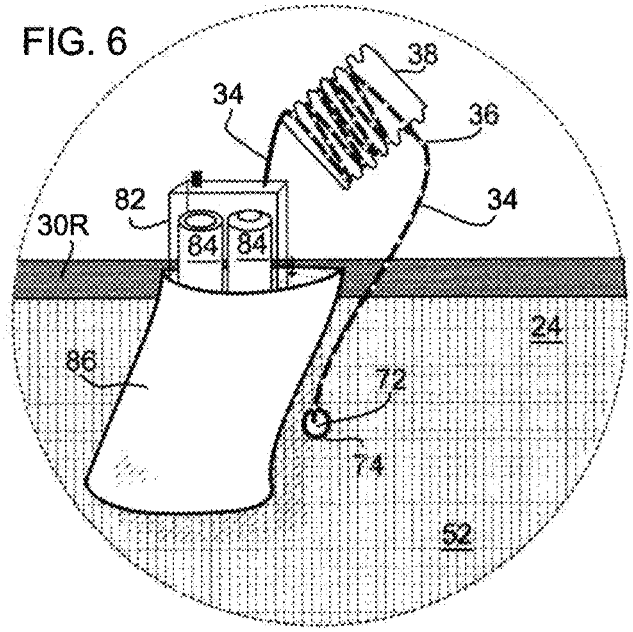
FIG. 6 is a partial rear view of the upper edge of the hanging scroll, revealing a textile sheet which provides the mount for the illustration on the obverse side, but now showing the rear of the top bar, and a battery pack housing being supported within a battery support bag, as well as showing how the elongated thin string of lights, has been passed through the first aperture in the textile sheet, so that the lights may be affixed at pin ornaments on the obverse side of the textile sheet.

In an embodiment, the textile sheet 24 has an upper edge 46 and a lower edge 48, and an obverse side 50. A reverse side 52 is seen in FIG. 6. Returning to FIG. 1, the obverse side 50 comprises a mount for a graphical rendering 26 of a coniferous tree 53. The top bar 30 is affixed to the upper edge 46 of the textile sheet 24. A hanger 28 is provided, and configured for attachment to the top bar 30, to facilitate suspension of the textile sheet 24 from the top bar 30.

Figure 2:
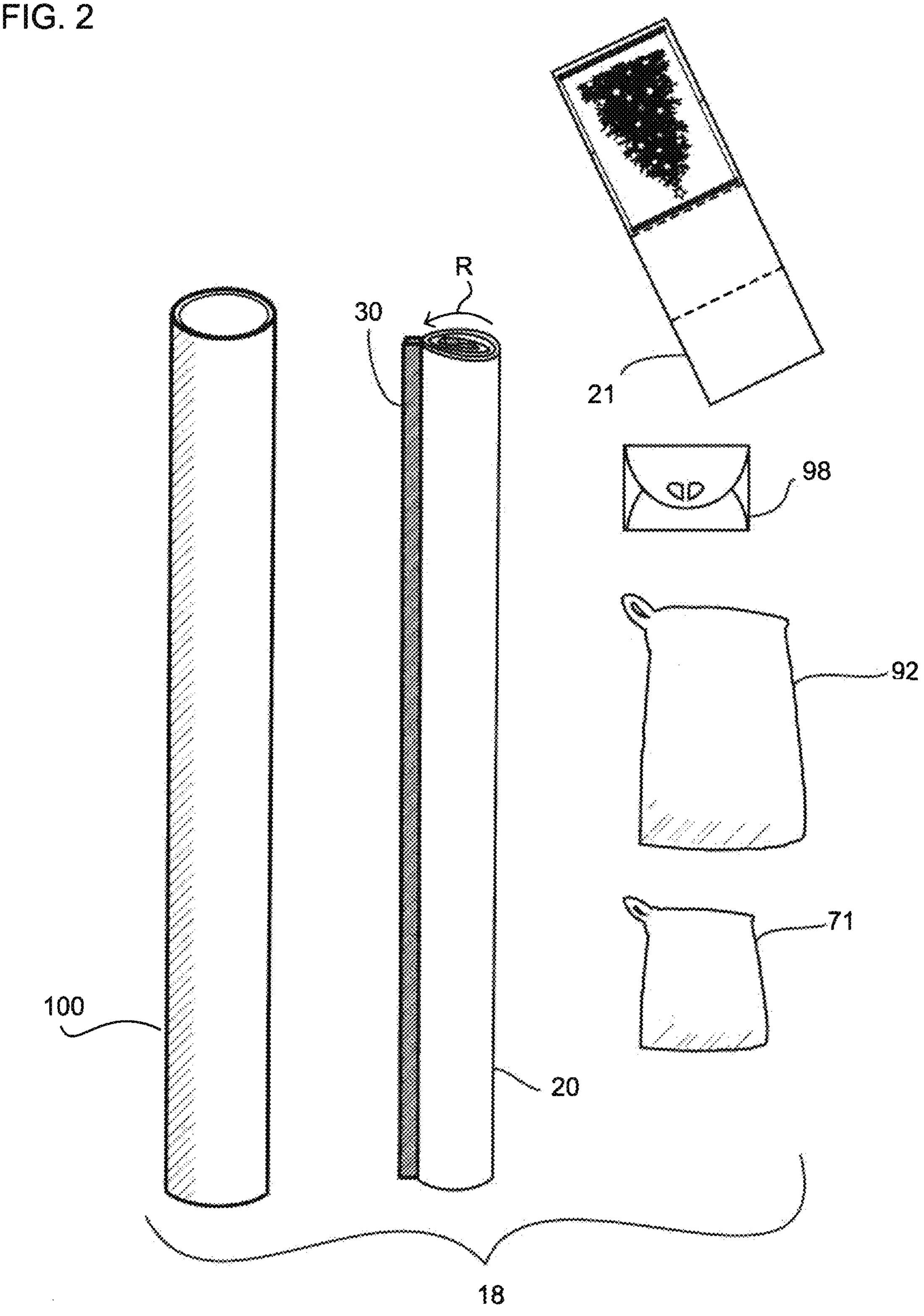
FIG. 2 is a perspective view of components of a kit for producing a hanging scroll Christmas tree with decorative ornaments, lights, and an instruction sheet, all as packaged for shipment, including a storage tube, and a hanging scroll in a rolled up condition.
Figure 3:
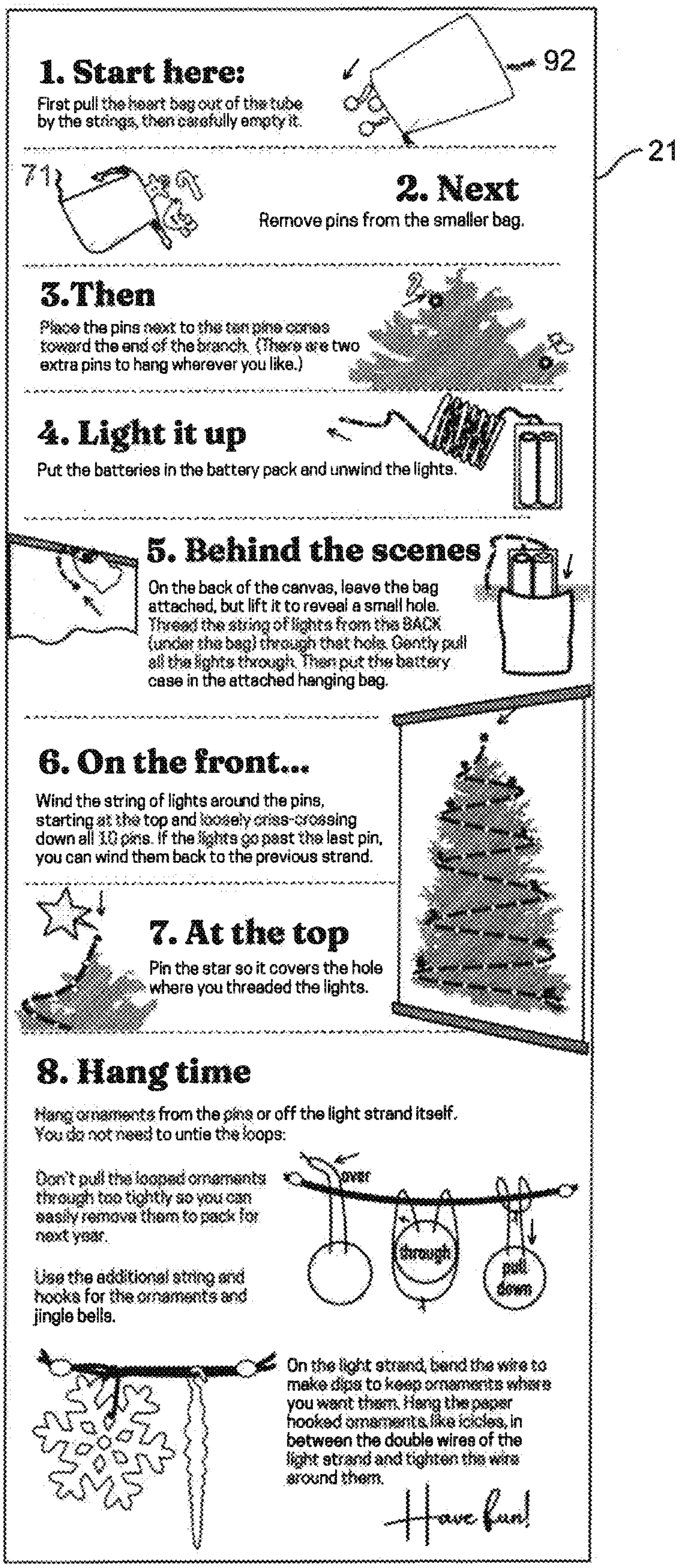
FIG. 3 provides an exemplary embodiment for an instruction sheet for assembly of the components of the kit disclosed herein, providing a step by step process for unpacking components, and installing components on the hanging scroll.

The bottom bar 32 is affixed to the lower edge 48 of the textile sheet 24. The textile sheet 24 is provided is provided in a rolled-up configuration, as indicated by arrow A, as seen in FIG. 2, for shipment. For use, as displayed, the bottom bar 32 is weighted to provide downforce to straighten the textile sheet 24 into a substantially planar vertical configuration when the textile sheet 24 is unrolled and hung.

In an embodiment, the bottom bar 32 may be provided in the form of an elongated two piece bar, wherein the elongated two piece bar has a front piece 32F and a rear piece 32R. In an embodiment, at least a portion of the lower edge 48 of the textile sheet 24, may be secured between the front piece 32F and the rear piece 32R. In an embodiment, at least a portion of the lower edge 48 of the textile sheet 24 may be adhesively secured to either the front piece 32F or the rear piece 32R, or both, of bottom bar 32.

Figure 5A:
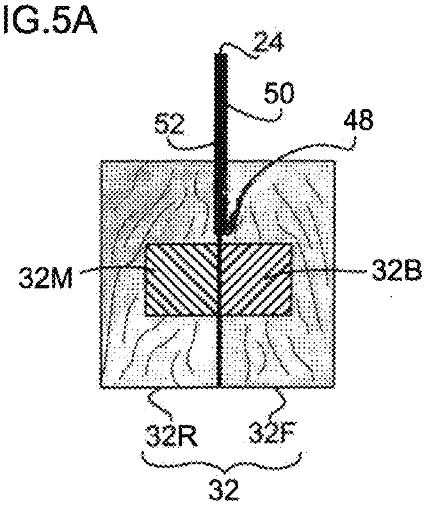
FIG. 5A is a vertical cross-sectional view of a bottom bar, showing a front piece and a rear piece of a two piece configuration for a bottom bar, which in an embodiment may be joined together with a fastening system which enables secure attachment to the textile sheet between the front piece and the rear piece using a magnetic holding system, including one or more magnets as a first magnetically effective fastening element, and one or more magnetic counter bodies made of a magnetically attractive material as a second magnetically effective fastening element, are illustrated.

In an embodiment, the front piece 32F and the rear piece 32R of the bottom bar 32 may be joined with a fastening system which enables secure attachment to textile sheet 24 between the front piece 32F and the rear piece 32R. As seen in FIG. 5A, in an embodiment, the just mentioned fastening system may be a magnetic holding system, including one or more magnets 32M as a first magnetically effective fastening element, and one or more magnetic counter bodies 32B made of a magnetically attractive material as a second magnetically effective fastening element. In such an embodiment, the one or more magnets 32M and the magnetic counter bodies 32B are provided in complementary, opposing locations in the front piece 32F and the rear piece 32R.

Figure 4:
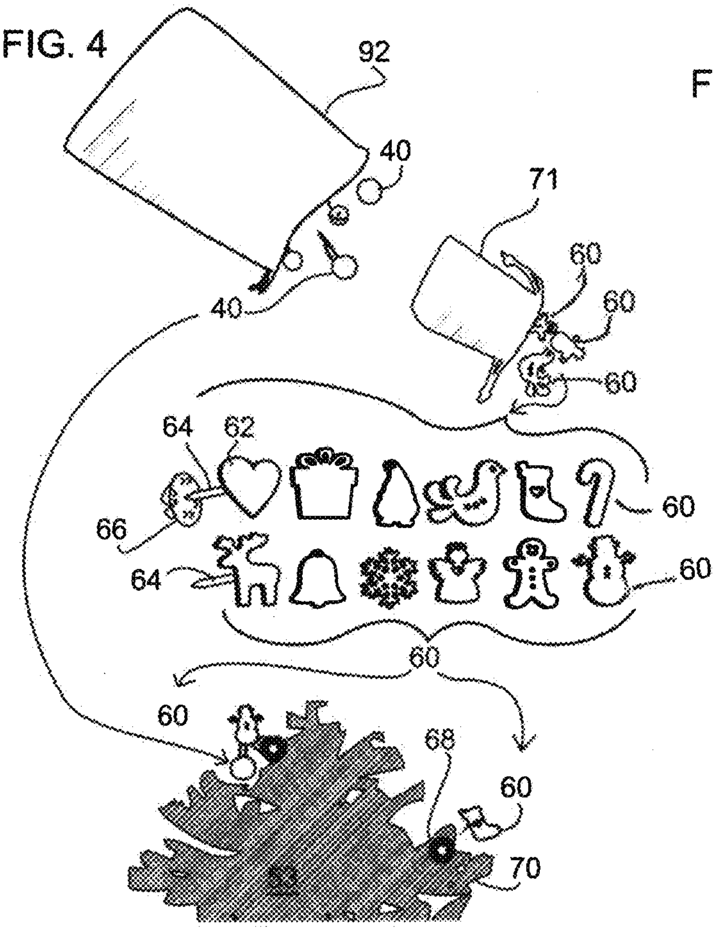
FIG. 4 is a schematic flow diagram showing how a first bag is emptied and prepared for installation, and how a second bag (here identified as a smaller, a pin ornament bag), is emptied of its plurality of pin ornaments, and then reference arrows show how selected contents from each bag are installed on the hanging scroll.
Figure 13:
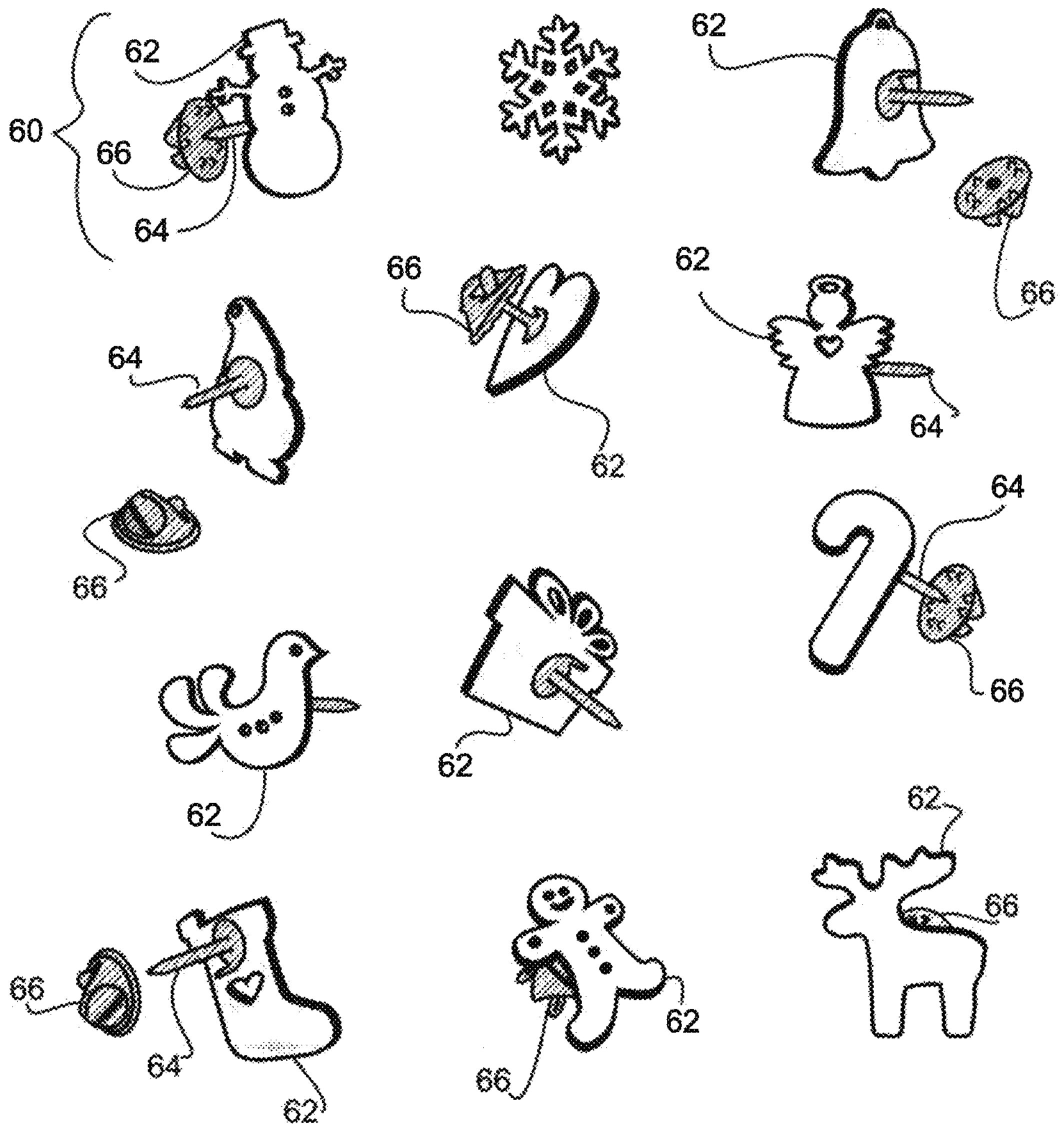
FIG. 13 illustrates a plurality of pin ornaments, as may be provided in an embodiment for a kit as described herein, and also showing a pin in one of the pin ornaments which may be used to penetrate the textile sheet to expose a portion of the pin at the reverse side of the textile sheet, where a locking pin back as illustrated may be used to secure the pin ornament to the textile sheet by secure locking engagement of the locking pin back with the pin of the pin ornament.

Returning now to FIG. 4, a plurality of pin ornaments 60 may be provided. As seen in FIG. 13, one or more of the plurality of pin ornaments 60 include an ornamental face 62, a pin 64 for secure attachment to, and through, the obverse side 50 of the textile sheet 24, and a locking pin back 66. The locking pin back 66 is configured for use on the reverse side 52 of the textile sheet 24 for locking attachment to the pin 64, so as to secure each of the one or more of the plurality of pin ornaments 60 to the textile sheet 24. In an embodiment, a suggested location for attachment of pin ornaments 60 may be provided in the graphical rendering 26 of a Christmas tree, by way of locations of cones 68 (see FIG. 1), which are generally located at or near distal ends 70 of boughs of the coniferous tree 53 depicted. A kit 18 may include between one (1) and twelve (12) pin ornaments. In an embodiment, a kit 18 may include at least ten (10) pin ornaments. As seen in FIG. 4, the pin ornaments 60 may be provided in a pin ornament bag 71.

Figure 5:
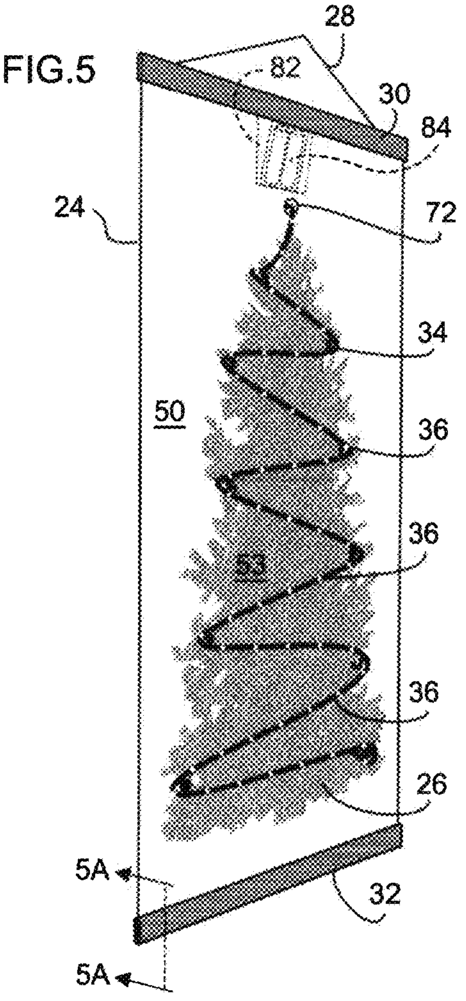
FIG. 5 is a side perspective view, showing how an elongated thin string of lights is installed on the hanging scroll, after pin ornaments are affixed at locations at or near distal ends of individual boughs on the coniferous tree as illustrated at locations marked by cones, as well as showing how a battery pack is located on the reverse side of the hanging scroll, in a battery support housing as further illustrated in FIG. 6 below.
Figure 7:
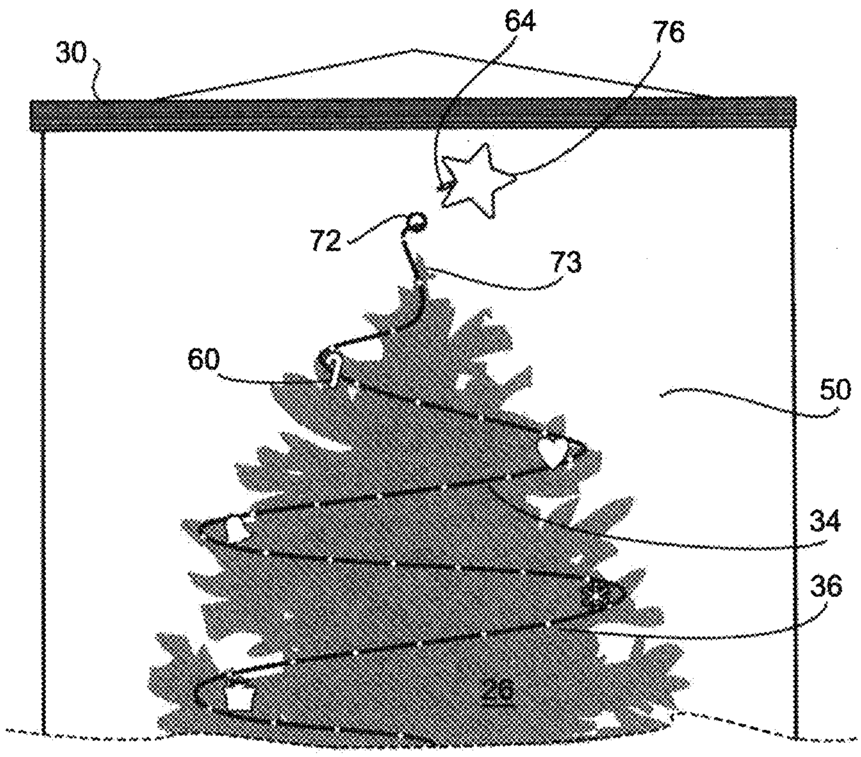
FIG. 7 is a partial front view of the hanging scroll with the elongated thin string of lights installed, and additionally showing how a large star shaped pin ornament may be used to conceal the first aperture through which the elongated thin string of lights emerges from the battery pack on the reverse side, for display on the obverse side.
Figure 8:
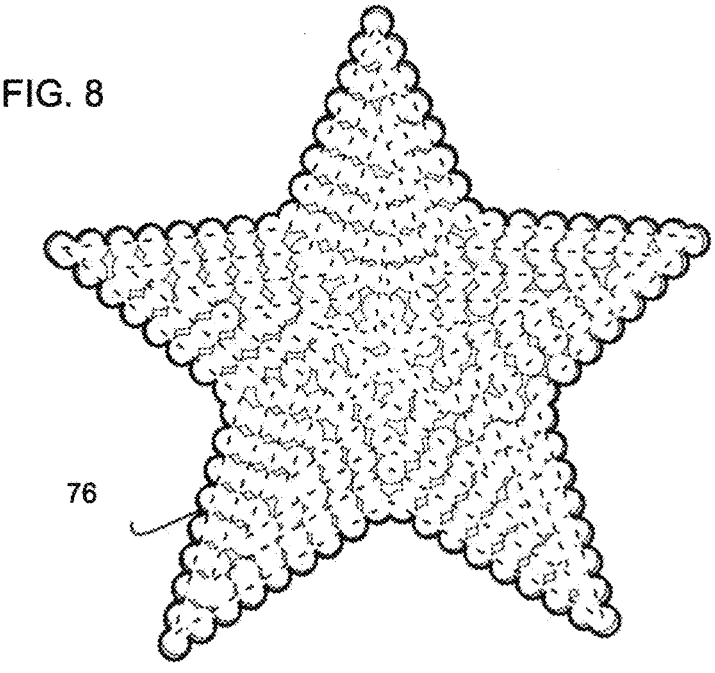
FIG. 8 is a close up view of the outer side of a large star shaped pin ornament which may be used for concealing the first aperture in the manner just noted above in relation to FIG. 7.

As can be appreciated from FIGS. 5, 6 and 7, an elongated thin string 34 of lights 36 may be provided. In an embodiment, the elongated thin string 34 of lights 36 may be shipped using a bobbin 38 for storage. In an embodiment, the coniferous tree 53 in the graphic rendering 26 has a treetop point 73. In an embodiment, the textile sheet 24 has first aperture 72 therethrough defined by first aperture sidewalls 74. The first aperture 72 may be located at or adjacent the treetop point 73. The first aperture 72 may be sized and shaped so as to allow the elongated thin string 34 of lights 36 to pass therethrough. In an embodiment, at least one of the pin ornaments 60 may be provided in the form of a large star 76, shown in FIG. 8, wherein the star 76 is sized and shaped to cover the first aperture 72 and a portion of the elongated thin string 34 of ornamental lights 36, when the hanging scroll 20 is unrolled and hung, and the elongated thin string 34 of ornamental lights 36 is deployed through the first aperture 72.

In an embodiment, a battery pack housing 82 may be provided in the kit. The battery pack may be used to provide electrical power to the elongated thin string 34 of lights 36. In an embodiment, the elongated thin string 34 of lights 36 may include between twenty (20) and fifty (50) individual lights 36. In an embodiment, the elongated thin string 34 of lights 36 may include about forty (40) lights.

Figure 10:
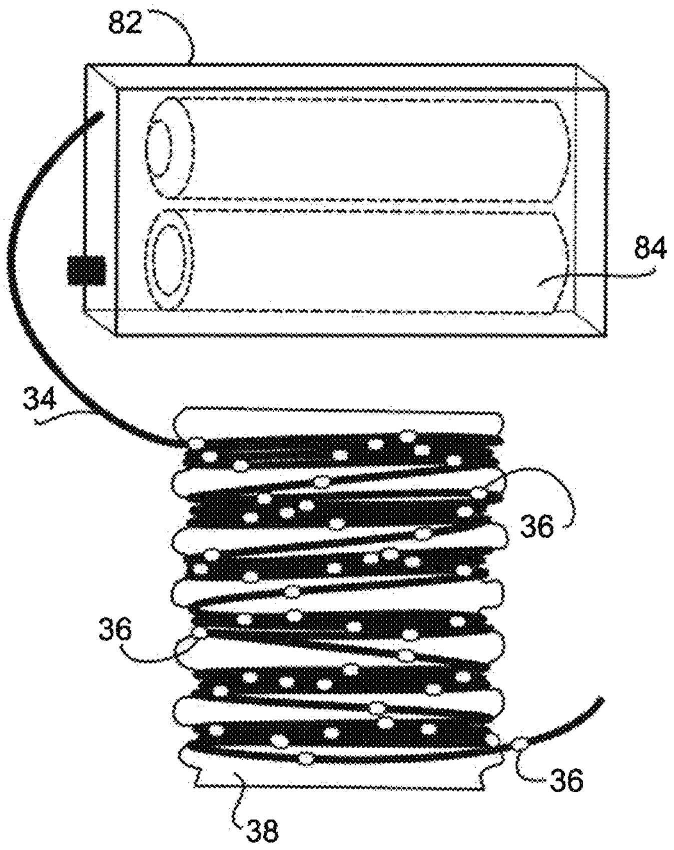
FIG. 10 illustrates a battery pack, with batteries therein, and the elongated thin string of lights which are powered by the battery pack, with the elongated thin string of lights shown in a shipping configuration wrapped on a supporting card.
Figure 11:
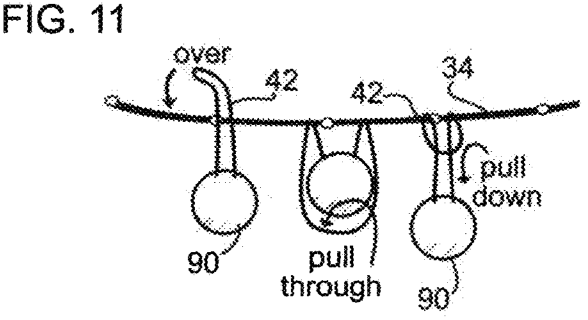
FIG. 11 provides an illustration from the instruction sheet to show users of the kit how to install, on the elongated thin string of lights, some of the hanging ornaments which are themselves hung from and supported by string loops.

As seen in FIG. 10, in an embodiment, a battery pack housing 82 may be provided. Such a battery pack housing 82 may be sized and shaped for containing batteries 84 therein. In an embodiment (see FIG. 6), a battery support bag 86 may be provided, and the battery support bag 86 may be affixed to the rear 30R of the top bar 30, as seen in FIG. 6, to hang down behind the reverse side 52 of the textile sheet 24, when the hanging scroll 20 is unrolled and hung.

Figure 14:
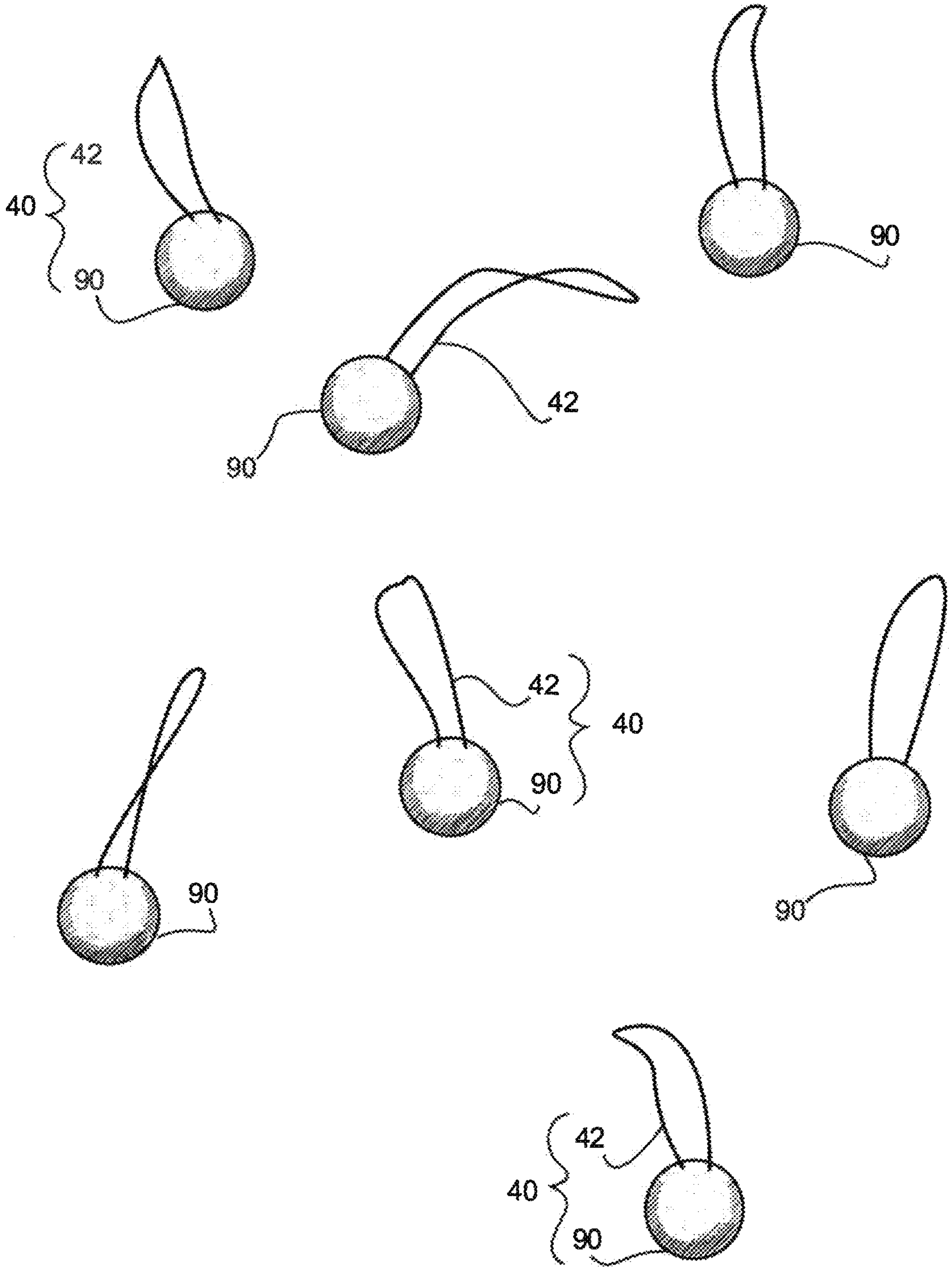
FIG. 14 illustrates a plurality of hanging ornaments, showing an embodiment of hanging ornaments of the type which are supported by string loops. In an embodiment, substantially spherical balls may be provided, which in an embodiment, may be in the form of woolen balls.

As seen in FIG. 4, and in more detail in FIG. 14, a plurality of first hanging ornaments 40 which are suspended by string loops 42 may be provided. In an embodiment, first hanging ornaments 40 may be provided in the form of spherical balls 90. In an embodiment, such spherical balls 90 may be woolen balls. In an embodiment, one or more of the plurality of hanging ornaments 40 includes a string loop 42, where the string loop 42 sized to enable a hanging ornament 40 to be suspended from the elongated thin string 34 of lights 36, when the hanging scroll 20 is unrolled and hung. In an embodiment, a spherical ornament bag 92 may be provided, sized and shaped to contain hanging ornaments 40 provided in a spherical configuration.

Figure 15:
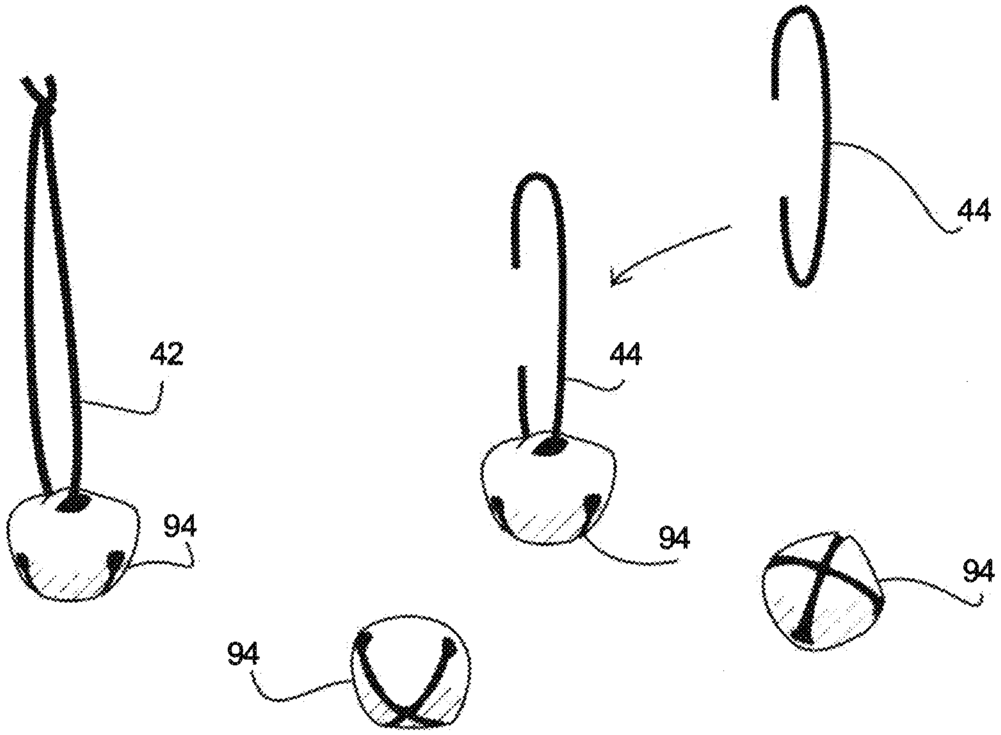
FIG. 15 illustrates a plurality of bells that may be supplied in an embodiment of for a kit as described herein; each bell may be hung using flexibly adjustable hooks as illustrated, or by string loops.
Figure 16:
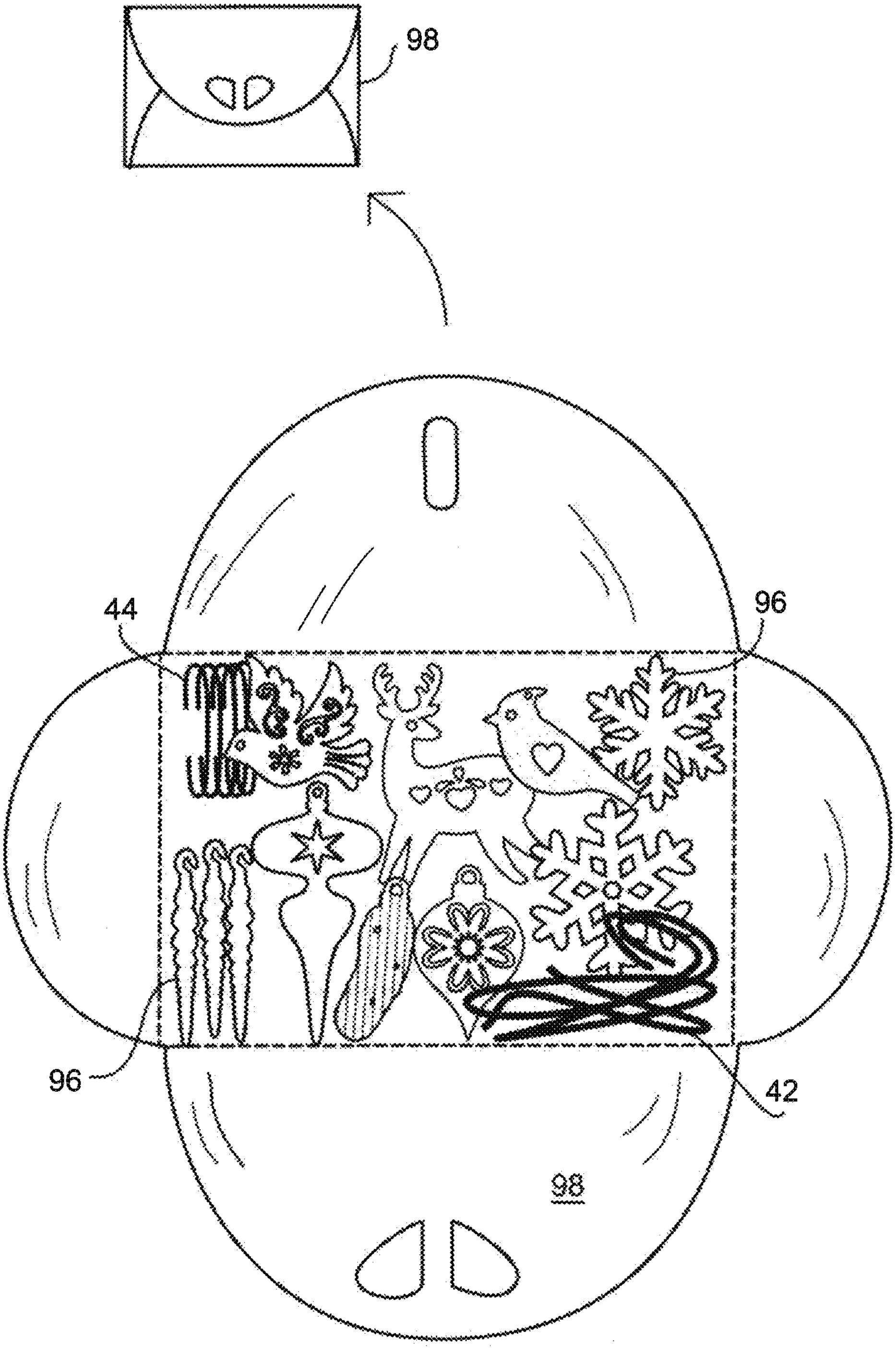
FIG. 16 includes a view of an open configuration of a pouch which may be supplied in an embodiment of for a kit as described herein, and may be used in a closed configuration for storage of ornaments which are configured in flat, thin, planar configuration, and may be made of various materials such as paperboard or plastic. Such planar ornaments maybe supported by hooks, or by string loops.

As seen in FIGS. 1, 15, and 16, in an embodiment, second hanging ornaments 43 suspended by hooks 44 may be provided in an embodiment of kit 18, a plurality of second hanging ornaments 43 each includes an attachment hook 44. The attachment hook 44 maybe sized and shaped to enable a second hanging ornament 43 to be suspended from the elongated thin string 34 of lights 36, when the hanging scroll 20 is unrolled and hung, i.e. when the pin ornaments 60 and the elongated thin string 34 of lights 36 are affixed to the hanging scroll 20.

As seen in FIG. 15, in an embodiment, a plurality of second hanging ornaments 43 may include a one or more bells 94, which are also amenable to hanging by attachment hook 44. In an embodiment, between one (1) and five (5) bells 94 are provided. In an embodiment, at least three (3) bells 94 are provided.

Figure 9:
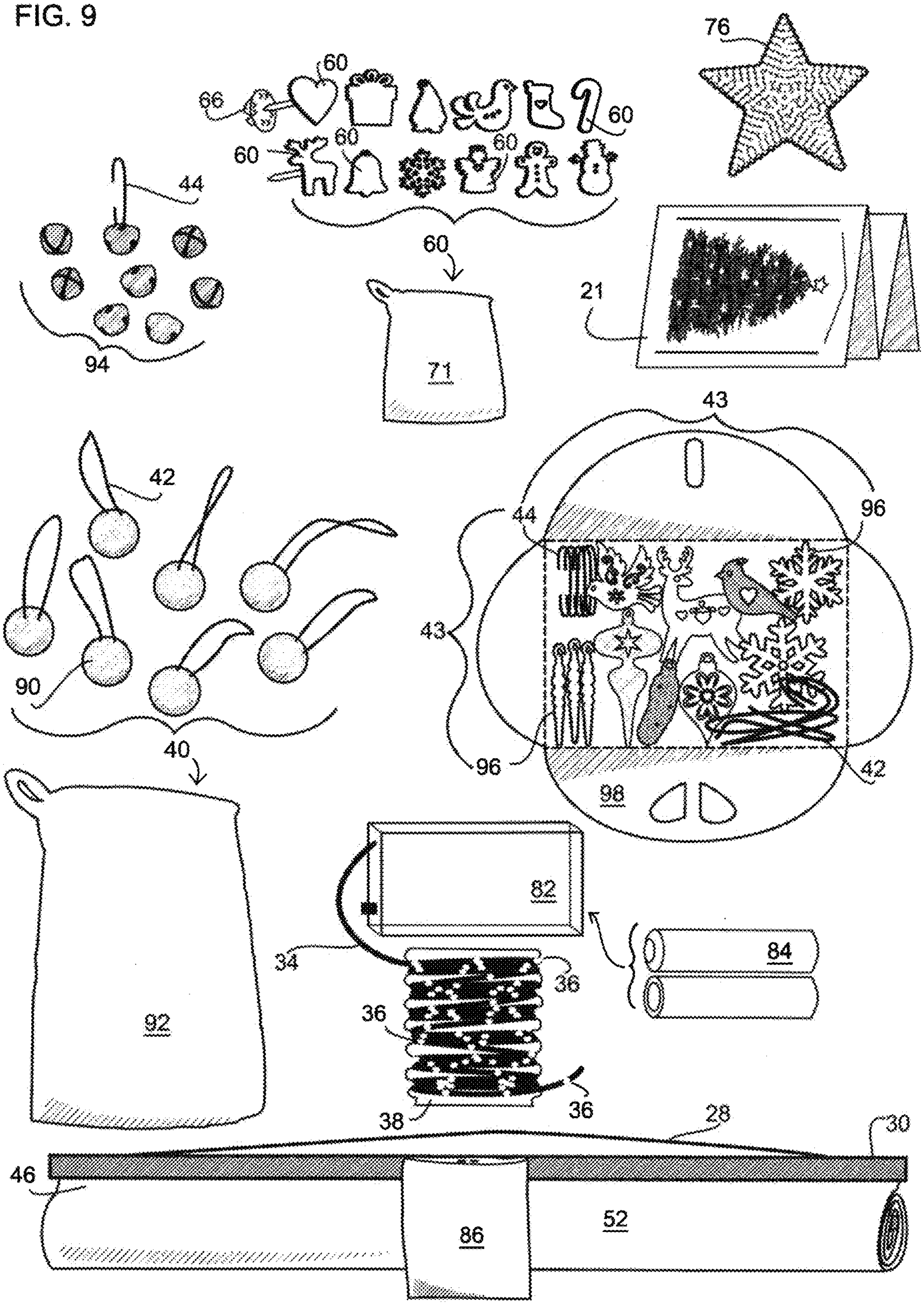
FIG. 9 illustrates an exemplary embodiment of a kit for providing a hanging scroll with Christmas tree graphic thereon, including the hanging scroll, showing a top bar from which the textile sheet hangs, and showing an embodiment for a hanger in the form of a supporting cord affixed to opposing sides of the top bar, a pin ornament bag, a hanging ornament bag, a set of instructions, a battery pack and associated batteries and elongated thin string of lights, and a battery support bag affixed to the rear of the top bar, a plurality of pin ornaments, a plurality of hanging ornaments with string loop supports, a plurality of handling ornaments with hooks, a pouch for holding a plurality of planar ornaments, some of which may be supported by string loop supports, and others which may be supported by hooks, and a plurality of bells which may be supported by hooks.

In an embodiment, at least some of the hanging ornaments are provided in a planar configuration, i.e. planar hanging ornaments 96. Planar hanging ornaments 96, such as the snowflake shown in FIG. 9, may be provided for suspension by attachment hooks 44, or by string loops 42. In any case, a kit 18 may include a planar ornament pouch 98 sized and shaped to contain planar hanging ornaments 96.

In various embodiments, between ten (10) and twenty (20) hanging ornaments, including both first hanging ornaments 40 and second hanging ornaments 43, may be provided. In various embodiments, at least fifteen (15) hanging ornaments, including both first hanging ornaments 40 and second hanging ornaments 43.

Finally, in a kit 18 may include a storage tube 100 as shown in FIG. 2, sized and shaped to contain for shipment and for storage, the hanging scroll 20, the pin ornaments, and first and second hanging ornaments 40 and 43, as well as the elongated thin string 34 of lights 36 and accompanying battery pack 82, which are all sized and shaped for secure internal containment in the storage tube 100.

It should be understood that the present disclosure is not limited to the details or methodology set forth in the description or illustrated in the figures. It should also be understood that the terminology used herein is for the purpose of description only and should not be regarded as limiting. It is understood that other means of manufacture or materials may be used, and devices that include some but not all of the described means of accomplishing the necessary steps outlined in this application may be employed and that any of these means are included within the scope of this document.

In the foregoing description, for purposes of explanation, numerous details have been set forth in order to provide a thorough understanding of the disclosed exemplary embodiments for a kit for a hanging scroll Christmas tree display with ornamentation and lighting. However, certain of the described details may not be required in order to provide useful embodiments, or to practice selected or other disclosed embodiments. Further, for descriptive purposes, various relative terms may be used. Terms that are relative only to a point of reference are not meant to be interpreted as absolute limitations, but are instead included in the foregoing description to facilitate understanding of the various aspects of the disclosed embodiments. And, various actions or activities in any method described herein by the instructions set out may have been described as multiple discrete activities, in turn, in a manner that is most helpful in understanding the present invention(s). However, the order of description should not be construed as to imply that such activities are necessarily order dependent. In particular, certain operations may not necessarily need to be performed precisely in the order of presentation. And, in different embodiments of kits assembled as taught herein, one or more elements or structures may be simultaneously provided, or eliminated in part or in whole while other elements may be added. Also, the reader will note that the phrases "in an embodiment", or "in one embodiment" have been used repeatedly. These phrases generally do not generally refer to the same embodiment; however, they may. Finally, the terms "comprising", "having" and "including" should be considered synonymous, unless the context dictates otherwise.

It will be understood by persons skilled in the art that embodiments for configurations of a kit for providing a hanging scroll Christmas tree with ornaments and lighting have been described herein to an extent appropriate for those skilled in the art to make and use such embodiments, and legal equivalents thereof. Additional details may be worked out by those of skill in the art for a selected set of specifications, useful life, materials of construction, and other design criteria for such kits.

Importantly, the aspects and embodiments described and claimed herein may be modified from those shown without materially departing from the novel teachings and advantages provided, and may be embodied in other specific forms without departing from the spirit or essential characteristics thereof. Therefore, the embodiments presented herein are to be considered in all respects as illustrative and not restrictive or limiting. As such, this disclosure is intended to cover the structures described herein and not only structural equivalents thereof, but also equivalent structures.

Although only certain specific embodiments of the present invention have been shown and described, the invention is not limited to such embodiments. Rather, the invention is to be defined by the appended claims and their equivalents when taken in combination with the description. Numerous modifications and variations are possible in light of the above teachings. Therefore, the protection afforded to this invention should be limited only by the claims set forth herein, and the legal equivalents thereof.

The invention claimed is:

1. A kit providing a graphic tree assembly system, the kit comprising:
- (a) a hanging scroll, the hanging scroll including
  - (i) a textile sheet, the textile sheet having an upper edge and a lower edge, and an obverse side and a reverse side, wherein the obverse side comprises a mount for a graphic rendering of a coniferous tree;
  - (ii) a top bar, the top bar affixed to the upper edge of the textile sheet;
  - (iii) a hanger, the hanger configured for attachment to the top bar, to facilitate suspension of the textile sheet from the top bar;
  - (iv) a bottom bar, the bottom bar affixed to the lower edge of the textile sheet, wherein the textile sheet is provided in a rolled-up configuration, and wherein the bottom bar is weighted to provide downforce to straighten the textile sheet into a substantially planar configuration when the textile sheet is unrolled and hung;
- (b) a plurality of pin ornaments, one or more of the plurality of pin ornaments including an ornamental face, a pin for secure attachment to the obverse side of the textile sheet, and a locking pin back, wherein the locking pin back is configured for use on the reverse side of the textile sheet for locking attachment to the pin, so as to secure each of the one or more of the plurality of pin ornaments to the textile sheet; and
- (c) an elongated thin string of lights, and wherein the coniferous tree in the graphic rendering has a treetop point, and wherein the textile sheet comprises a first aperture therethrough defined by first aperture sidewalls, and wherein the first aperture is located at or adjacent the treetop point, and wherein the first aperture is sized so as to allow the elongated thin string of lights to pass therethrough.

2. A kit as set forth in claim 1, further comprising a battery pack, the battery pack configured to provide electrical power to the elongated thin string of lights.

3. A kit as set forth in claim 2, wherein the elongated thin string of lights comprises between twenty (20) and sixty (60) individual lights.

4. A kit as set forth in claim 2, further comprising a battery pack housing, the battery pack housing sized and shaped for containing the battery pack therein.

5. A kit as set forth in claim 4, wherein the battery pack housing is attached to the top bar, and wherein the battery pack housing is configured for suspension from the top bar at a location adjacent to and behind the reverse side of the textile sheet when unrolled and hung.

6. A kit as set forth in claim 1, wherein the mount comprises a single color mount.

7. A kit as set forth in claim 1, wherein the textile sheet comprises a canvas sheet.

8. A kit as set forth in claim 7, comprising between ten (10) and twenty (20) hanging ornaments.

9. A kit as set forth in claim 7, comprising at least fifteen (15) hanging ornaments.

10. A kit as set forth in claim 1, further comprising a plurality of hanging ornaments.

11. A kit as set forth in claim 10, wherein one or more of the plurality of hanging ornaments includes a string loop, the string loop sized to enable a hanging ornament to be suspended from (i) one of the plurality of pin ornaments, or (ii) from the elongated thin string of lights, when the hanging scroll is unrolled and hung.

12. A kit as set forth in claim 10, wherein one or more of the plurality of hanging ornaments includes an attachment hook, the attachment hook sized to enable a hanging ornament to be suspended from the elongated thin string of lights, when the hanging scroll is unrolled and hung, and when the pin ornaments and the elongated thin string of lights are affixed to the hanging scroll.

13. A kit as set forth in claim 10, wherein one or more of the plurality of hanging ornaments comprises a bell.

14. A kit as set forth in claim 13, wherein between one (1) and five (5) bells are provided.

15. A kit as set forth in claim 1, wherein the bottom bar comprises an elongated two piece bar, the elongated two piece bar having a front piece and a rear piece, and wherein at least a portion of the lower edge of the textile sheet is secured between the front piece and the rear piece.

16. A kit as set forth in claim 15, wherein the lower edge of the textile sheet is adhesively secured to the front piece or to the rear piece, or to both.

17. A kit as set forth in claim 15, wherein the front piece and the rear piece of the bottom bar are joined with a fastening system which securely joins together the front piece and the rear piece.

18. A kit as set forth in claim 17, wherein the fastening system comprises a magnetic holding system, including one or more magnets as a first magnetically effective fastening element, and one or more magnetic counter bodies made of a magnetically attractive material as a second magnetically effective fastening element, and wherein one or more magnets and the one or more magnetic counter bodies are provided in complementary, opposing locations in the front piece and the rear piece.

19. A kit as set forth in claim 1, further comprising instructions for assembly of components of the kit to produce a hanging scroll.

20. A kit as set forth in claim 1, wherein the coniferous tree depicted on the obverse side of the hanging scroll is a graphic rendering of a Christmas tree.

21. A kit as set forth in claim 1, comprising between one (1) and twelve (12) pin ornaments.

22. A kit as set forth in claim 1, comprising at least ten (10) pin ornaments.

23. A kit as set forth in claim 1, further comprising a pin ornament bag, and wherein pin ornaments are provided in the pin ornament bag.

24. A kit as set forth in claim 1, wherein at least one of the pin ornaments comprises a star, and wherein the star is sized and shaped to cover the first aperture and a portion of the elongated thin string of ornamental lights, when the hanging scroll is unrolled and hung, and the elongated thin string of ornamental lights is deployed through the first aperture.

25. A kit as set forth in claim 1, wherein at least some of the hanging ornaments are provided in a planar configuration, further comprising a planar ornament pouch sized and shaped to contain hanging ornaments provided in a planar configuration.

26. A kit as set forth in claim 1, wherein at least some of the hanging ornaments are provided in a spherical configuration, further comprising a spherical ornament bag sized and shaped to contain hanging ornaments provided in a spherical configuration.

27. A kit as set forth in claim 1, further comprising a storage tube, and wherein the hanging scroll, the pin ornaments, and the elongated thin string of lights are all sized and shaped for secure internal containment in the storage tube.

* * * * *